United States Patent [19]

Robinson

[11] 4,224,298

[45] Sep. 23, 1980

[54] REFORMING OF HYDROCARBONS

[76] Inventor: Lee F. Robinson, 3 Athenaeum Hall, Vale-of-Health, London NW3 1AP, England

[21] Appl. No.: 895,454

[22] Filed: Apr. 11, 1978

[30] Foreign Application Priority Data

Apr. 14, 1977 [GB] United Kingdom ............... 15771/77

[51] Int. Cl.$^2$ ........................... C01C 1/04; C07C 1/02
[52] U.S. Cl. .................................... 423/359; 252/373; 48/214 A; 423/650
[58] Field of Search ............... 423/359, 650, 652, 460, 423/DIG. 16; 48/214 A; 252/373

[56] References Cited

U.S. PATENT DOCUMENTS 3,397,962  8/1968  Squires ............................... 48/214 X Primary Examiner—O. R. Vertiz
Assistant Examiner—Gregory A. Heller
Attorney, Agent, or Firm—Bernard & Brown

[57] ABSTRACT

A process and apparatus for reforming hydrocarbons utilizing a fluidized bed furnace through which pass reformer tubes, the pressure in the fluidized bed and in the tubes being substantially the same and in excess of 50 atmospheres absolute. For hydrocarbons which have been steam reformed, the reformed high pressure product can be converted to synthesis gas for use in the high pressure catalytic synthesis of ammonia.

10 Claims, 4 Drawing Figures

REFORMING OF HYDROCARBONS

This invention relates to a process of reforming hydrocarbons, such as steam reforming, to produce a hydrogen-containing gas, which can be used, after any necessary further treatment, as a synthesis gas for various industrial processes, such as the catalytic synthesis of ammonia.

The catalytic synthesis step in the production of ammonia normally operates at high pressures of the order of 100 atmospheres absolute or more, e.g. 150 atmospheres absolute or higher. However the first step in the process, namely the steam reforming of hydrocarbons in the production of synthesis gas, is usually performed at much lower pressures of the order of 20–30 atmospheres, with the result that the gases from the reformer must be severely compressed before entry to the catalytic synthesis step. Where the hydrocarbon feedstock fed to the reformer is high pressure natural gas, it must be reduced in pressure before being introduced to the reformer and the subsequent re-compression necessary after reforming entails a substantial, and apparently unnecessary, energy loss. There would be considerable savings in both energy consumption and capital plant if the entire process could be operated at a uniformly high pressure thereby eliminating the high compression step, but attempts to that end have been frustrated by the problems accompanying high pressure operation of the reformer.

Steam reforming is performed by passing the reactants—hydrocarbon gas or gasified liquid hydrocarbons and steam—through reformer tubes which contain a catalyst and which are located in a furnace which normally operates at a pressure near atmospheric pressure. If the reactants were at a high pressure of e.g. 150 atmospheres absolute, the pressure differential between the interior of the tubes and the interior of the furnace chamber would necessitate the use of thick walled tubes. At the same time, the higher pressure of operation would require a higher reaction temperature, which coupled with the temperature gradient through the thick tube walls, would necessitate a considerably elevated furnace temperature. These factors would impose almost impossibly severe metallurgical constraints on the reformer tubes which would readily give rise to tube failure in operation.

According to the present invention I provide a process for reforming hydrocarbons in which reforming is performed at a pressure in excess of 50 atmospheres absolute in reformer tubes passing through, or located in, a fluidised bed furnace maintained at a pressure which does not differ substantially from that in the tubes.

In another aspect the invention provides a method of production of a hydrogen-rich gas at a pressure in excess of 50 atmospheres absolute which comprises reforming a hydrocarbon feedstock in a reforming zone comprising a plurality of reformer tubes passing through, or located in, a fluidized bed furnace, maintaining the pressure in the reforming zone at a pressure in excess of 50 atmospheres absolute, supplying fuel and oxygen containing gas to the fluidized bed furnace thereby to maintain the reforming zone under reforming conditions, and maintaining the pressure in the fluidized bed furnace at a pressure not substantially different from the pressure in the primary reforming zone.

Advantageously the reforming is carried out with steam to yield a hydrogen-containing gas, which can be used as a basis for the synthesis gas used in the catalytic synthesis of ammonia.

Therefore according to a still further aspect of the invention, I provide a process for the catalytic synthesis of ammonia comprising the steps of reforming a hydrocarbon feedstock with steam in a primary reforming zone maintained at a pressure in excess of 50 atmospheres absolute and comprising reformer tubes passing through or located in, a fluidized bed furnace maintained at a pressure which does not differ substantially from that in the tubes, converting resulting reformed product to a synthesis gas containing hydrogen and nitrogen, passing resulting synthesis gas without further compression to an ammonia synthesis loop for the catalytic conversion of synthesis gas to ammonia, and recovering ammonia formed.

Typically the step of converting reformed product from the primary reforming zone comprises treating the reformed product gas by a secondary reforming process which provides nitrogen into the system, converting carbon oxides to carbon dioxide, and scrubbing out carbon dioxide, whereby a mixture of hydrogen and nitrogen in the proportions of 3:1 is produced.

When employing the present invention, because of the reduction in pressure differential across the tube walls, those walls can be relatively thin, the temperature differential between the tube interior and the furnace is reduced, and the metallurgical problems are not significantly greater than those of previously known low pressure reformer tubes.

The invention also relates to apparatus for the reforming of hydrocarbons comprising a fluidized bed furnace housed in a pressure vessel able to withstand an internal pressure in excess of 50 atmospheres absolute, and substantially vertical reformer tubes extending through, or located in, the zone occupied by the fluidized bed in operation of the furnace.

The construction and operation of fluidized bed combustion furnaces, using sand or the like as the fluidized medium and operating at pressures of the order of 100 atmospheres absolute, have already been established, and such a furnace can operate with a bed height less than the height required of the reformer tubes. A fluidized bed furnace has a high heat transfer rate, being about seven times that of a conventional furnace and consequently has a high efficiency. It can be operated to give a uniform temperature throughout the furnace, resulting in, firstly, the absence of temperature difference between the furnace wall and the tube walls as is the case in conventional furnaces, and secondly, the absence of the tube hot spots which are at present a cause of failure of reformers; alternatively the bed can be controlled to have a vertical gradation of temperature if required for the reforming process. Further, the grit-like constituency of the bed inert material constantly cleans the tubes and prevents the build-up of carbon deposits on their exteriors.

The fuel supplied to the furnace can be low grade, and can be for example ground coal or lignite. Where the hydrocarbon feedstock is natural gas at high pressure, the furnace fuel can be taken from the same source, thereby ensuring equality of pressure in the tubes and in the furnace, and the automatic close-down of the furnace on failure of the feedstock supply.

The reformer furnace is preferably in the form of a pressure vessel, having a circular cross-section through which the reformer tubes pass vertically. Where the fuel has an appreciable content of sulphur it is an advantage to use for the bed, or as a component of the bed, a material which absorbs or adsorbs sulphur or sulphur oxides, as for example dolomite, in particulate form since sulphur-containing gases are thereby removed from the furnace exhaust gases to the benefit of the environment.

The thermal capacity of the bed material enables the reformer to be restarted quickly after a temporary shutdown. Alternatively, the furnace can be quickly cooled by fluidization with cold air, if that becomes necessary.

By virtue of the invention, it is possible to operate a reformer at the same high pressure as, for example a subsequent ammonia synthesis plant, and to avoid the use of compressors between the reforming and synthesis processes. Where the hydrocarbon feedstock is natural gas supplied at high pressure, it is no longer necessary to reduce the pressure before entry to the reformer.

The pressure inside the reformer tubes does not differ substantially from the pressure of operation of the fluidized bed furnace. In this way the thickness of the tube walls can be reduced to comparatively small values despite the high operating pressure of the reformer tubes. Thus, depending on the material of construction and the sophistication of the differential pressure control system used to monitor and control the conditions inside and outside the reformer tubes, the wall thickness can in suitable cases be reduced to within the range of from about 5 mm to about 15 mm. However the use of thicker walled reformer tubes is not ruled out. Usually it will be preferred to operate with a pressure differential across the reformer tube wall that is as small as possible and ideally zero. However this may be difficult to achieve in practice. Operating the fluidized bed furnace at a pressure in excess of that inside the reformer tube is generally to be preferred to the contrary situation. Usually it will be preferred to operate the fluidized bed furnace at a pressure not more than 30 atmospheres above or below the pressure in the reformer tubes, particularly within about 20 atmospheres of the pressure in the reformer tubes. It is particularly preferred to design the reformer so that the pressure differential across the walls is less than about 10 atmospheres, e.g. 5 or less, so that the tube wall thickness can be kept as small as possible. Clearly the greater the pressure differential across the tube wall the greater must its thickness be and the less benefit that will be attained by adopting the teachings of the present invention.

The invention is not limited to the use of natural gas as the hydrocarbon feedstock. In place of, or as a supplement to natural gas, there may be used LPG (liquefied petroleum gas), butane, naphtha, heating oils, gas oils, or similar hydrocarbon materials, or a mixture of two or more thereof.

Furthermore the invention is also applicable to the production of synthesis gas for other purposes than ammonia synthesis e.g. for methanol synthesis, for hydroformylation, for the manufacture of town gas and for reducing gas used in metallurgical processes such as iron ore reduction, where a hydrogen rich gas is required at substantial pressure.

The invention will now be further described by way of example with reference to the accompanying drawings wherein.

Figure 1:
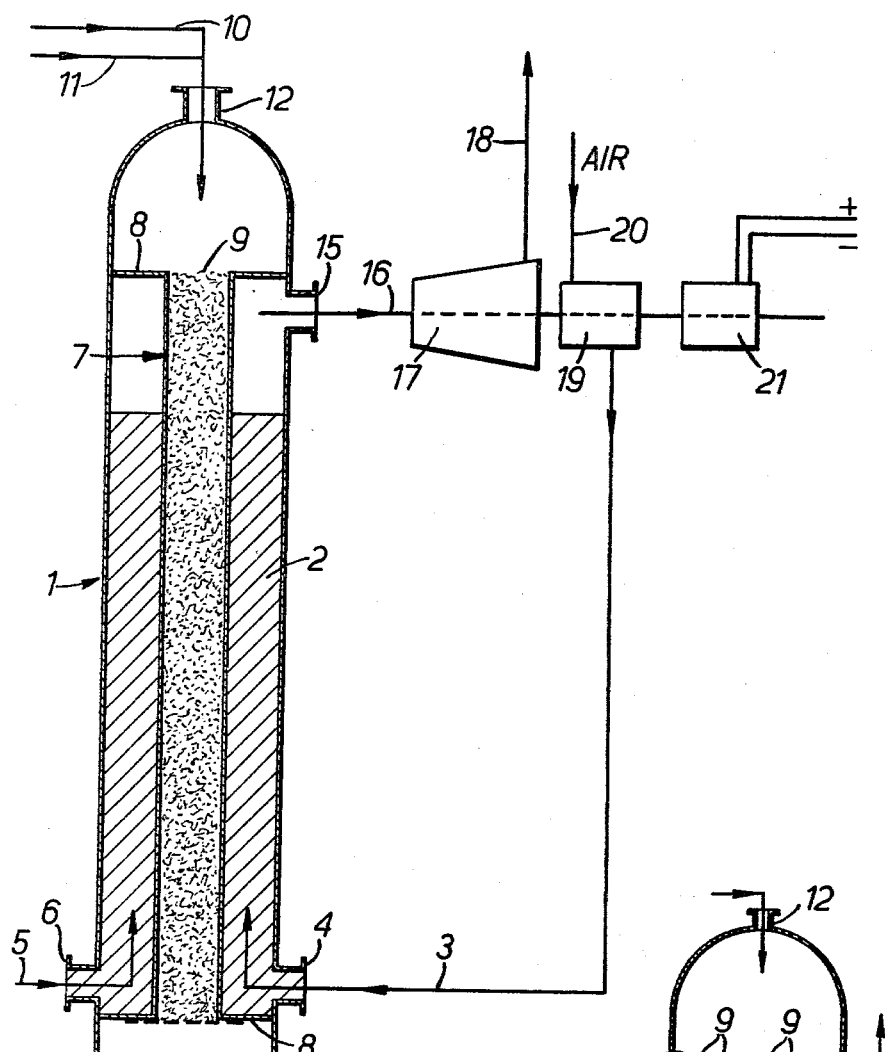
FIG. 1 is a diagram illustrating the principle of operation of a steam reforming process using a single reformer tube.

Referring firstly to FIG. 1, the illustrated steam reforming process uses a pressure vessel 1 containing a fluidized combustion bed 2 which consists of a suitable bed material such as sand or dolomite which is kept in a fluid state by passage therethrough of air along line 3 through inlet 4 and fuel at a suitably high pressure, such as gas or vaporised oil, along line 5 through inlet 6. The fuel will burn in the air stream, and the resultant products of combustion will maintain the bed in a fluidized condition and provide heat for the catalytic reaction which takes place within the reformer tube.

The introduction of air and fuel into the fluidized combustion zone 2, is here illustrated in principle only. In practice there are well established methods available for doing this.

Within the vessel 1 is positioned a reformer tube 7 welded at each end to a plate 8 welded to the pressure vessel 1. Tube 7 is packed with suitable catalyst 9. Hydrocarbon feedstock and superheated steam are introduced to tube 7 under pressure via lines 10 and 11 respectively entering the top of the pressure vessel via inlet 12. Tube 7 is heated by the fluidized combustion bed 2. Any suitable particulate material can be used in the fluidized bed furnace, for example sand. However, it is preferred to incorporate in the particulate material a proportion of a sulphur-absorbing or -adsorbing material such as dolomite. Combustion bed 2 is operated at a pressure close to the pressure of the reactants inside the tube 7, so that the difference in pressure on both sides of the tube 7 will at all times be small. In consequence tube 7 can be relatively thin-walled.

Figure 2:
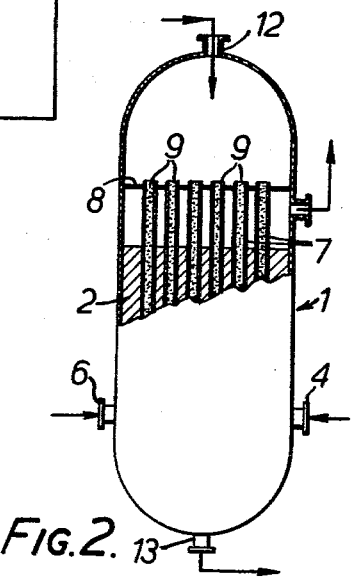
FIG. 2 is a diagram showing a reformer for steam reforming having a plurality of reformer tubes.

While FIG. 1 illustrates the principle of the process by the use of a single tube 7, in practice and particularly when large capacity plants are employed, many tubes 7 will be employed, as shown diagrammatically in FIG. 2, each passing through the same fluidized combustion bed 2. The tubes 7 are each welded at top and bottom to a tube plate 8 welded to the pressure vessel 1.

The product reformed gas withdrawn through outlet 13 on line 14 is still under pressure and will pass to the next stage in the process for which it is required. In the case of the catalytic synthesis of ammonia this may be a secondary reformer step, in which air is added to burn unconverted hydrocarbons to carbon oxides, and to provide the nitrogen required for the final ammonia synthesis; this is followed by a shift conversion step to convert carbon monoxide to carbon dioxide, and by a chemical washing step to remove carbon dioxide, leaving only hydrogen and nitrogen in the proportions of 3 to 1, ready for the final synthesis step.

The hot combustion gases from the fluidized bed 2 are withdrawn via inlet 15 and line 16 still at high operating pressure to gas turbine 17 which is connected to a flue gas stack via line 18 and to an air compressor 19, fed with air via line 20, which supplies air to line 3, and also to an electrical generator 21. Thus the high pressure combustion products are used to provide compressed air for the fluidized bed and power for general use.

The pressure within the tubes 7 is controlled so that reforming is carried out at a pressure in excess of 50 atmospheres, preferably 100 atmospheres or above.

Figure 3:
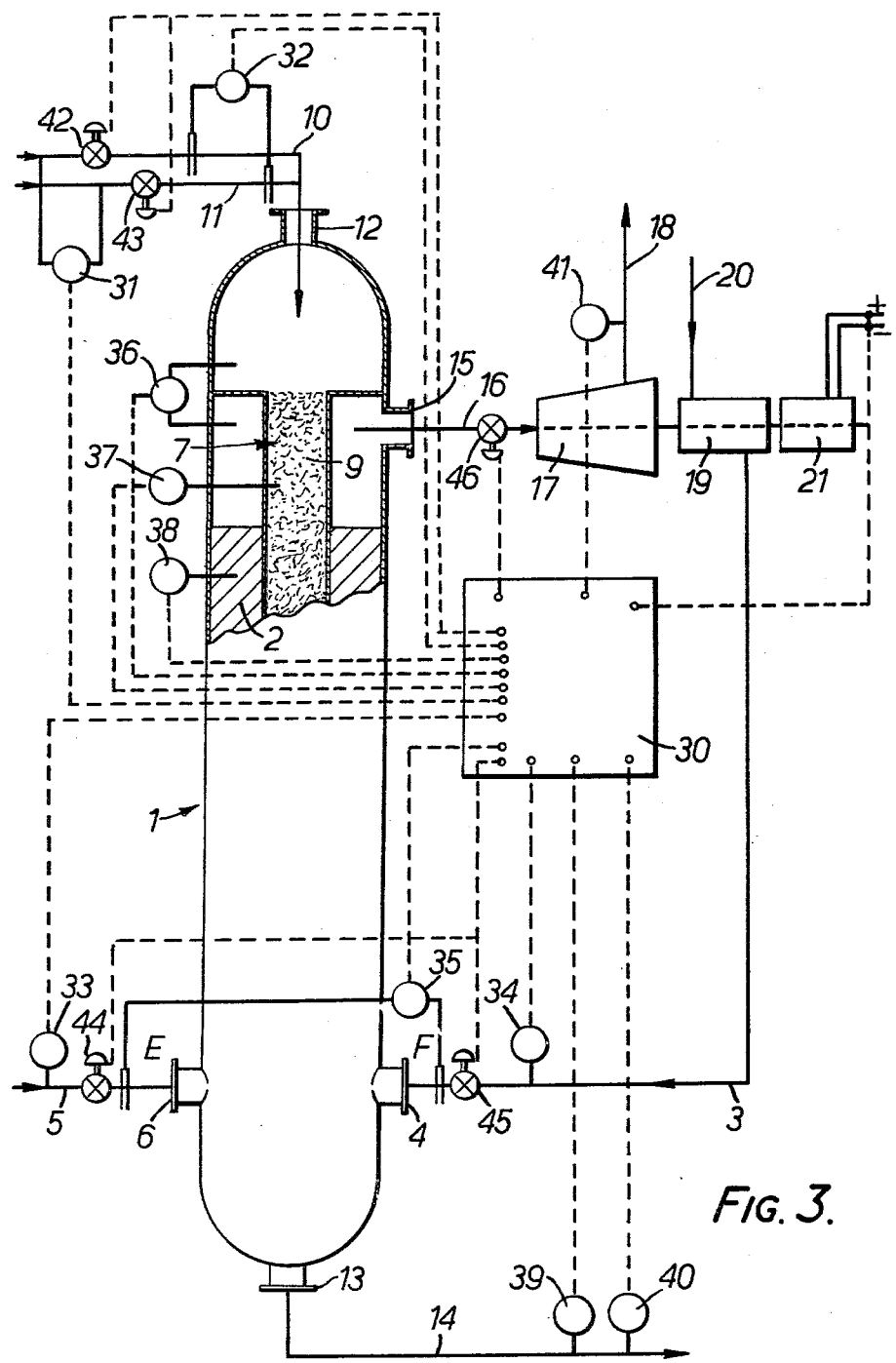
FIG. 3 is a diagram corresponding to FIG. 1 showing the controls applied to the process.

It is important that temperatures and pressures are controlled throughout the reforming process for safe operation. Suitable control positions are illustrated in FIG. 3, where 30 represents a computerised control centre for the process, and the broken lines represent feed lines to the control centre for information obtained at various points in the system or, as the case may be, control lines for feeding signals from the control centre 30 to the pressure control valves. Thus the pressures of the hydrocarbon feedstock and steam streams of lines 10 and 11 are monitored at 31 and the flow ratio of these two streams at 32. The pressure of the inlet feed to the pressure vessel in line 5 is monitored at 33 and the pressure of the inlet air in line 3 is monitored at 34. The air/fuel flow ratio is monitored at 35.

The difference in pressure between the reactants passing through tubes 7 and the pressure in the pressure vessel 1 is monitored at 36 and the temperatures in the tubes 7 and in the fluidized bed 2 are monitored at 37 and 38 respectively. The pressure and temperature of the product reformed gas are monitored at 39 and 40 respectively. The temperature of the flue gas removed via line 18 is monitored at 41.

The flow rate and pressure of the inlet hydrocarbon feedstock are controlled by control valve 42, whilst flow of the superheated steam is controlled by control valve 43. Similarly the flows of the furnace fuel, of the furnace air and of the exhaust gases from the furnace are controlled by valves 44, 45 and 46 respectively. All of these valves 42, 43, 44, 45 and 46 are themselves controlled by means of signals from control centre 30.

By the provision of controls as illustrated the pressures and flow ratios of the feeds to the reformer tubes 7 and fluidized bed 2 are kept constant to maintain the correct combustion and fluidized conditions in bed 2 and the correct reforming conditions within tubes 7. It is essential that the differential pressure measured at 36 be maintained within fairly narrowly defined limits and the signal from 36 fed to control centre 30 is used to adjust other variables accordingly. If the pressure differential varies too greatly or too quickly, emergency procedures are initiated.

The hot exhaust gases in line 16 are used to drive turbine 17, which in turn drives compressor 19 and generator 21 in tandem. If the turbine 17 fails, the compressor 19 will be driven by generator 21 drawing power from the electricity grid supply, thus allowing the air supply to continue to flow to vessel 1 and safely cool down the apparatus even when fuel supply and feedstock are cut off.

The catalyst used in the reformer tubes may be any of those known to be suitable for the particular synthesis gas being generated. Such catalyst may be in any of the commercially available forms e.g. in the form of pellets, extrusions, or rings.

When the invention is applied to steam reforming, the ratio of steam to hydrocarbon may be varied in dependence on the nature of the feedstock, on the composition required for the synthesis gas and on the pressure of operation. When using natural gas, steam:hydrocarbon ratios of from about 2:1 up to 5:1 or as may be appropriate. Generally speaking higher steam:hydrocarbon ratios are preferred at higher operating pressures in order to prevent carbon deposition on the catalyst, inter alia, and because of the generally less favourable equilibrium conditions.

The materials of construction of the reformer tubes may be conventional, for example high alloy stainless steels, or niobium steels.

The feed temperature to the reformer tubes will usually be of the order of 500° C. or more. The external temperature of the reformer tubes may rise as high as about 975° C. or more but should not be allowed to exceed the appropriate safe temperature of operation which depends among other things on the material of construction of the reformer tubes.

Typical pressures for operation of ammonia synthesis loops may be as high as 220 atmospheres or more. Thus the pressure in the reformer tubes located in the fluidized bed furnace may be up to 220 atmospheres or higher. Usually it will not be necessary to exceed pressures of 300 atmospheres.

If a reformer such as that shown in FIG. 2 above is used as the first stage in the catalytic production of ammonia to produce of the order of 500 tonnes ammonia per day one could safely use a pressure vessel of for example 10 meters in length and 1.5 to 2 meters in diameter (internal) carrying approximately 150 reformer tubes of about 50 mm internal diameter and 5 to 15 mm wall thickness.

This compares most favourably with what is required in a conventional low pressure reformer unit. In the conventional system, from three to four times the number of tubes would be required, the tubes would be from 100 to 150 mm internal diameter, and their wall thickness would be of the order of 10–25 mm. The tubes would be arranged in widely spaced rows, suspended in a very large furnace box measuring perhaps 30 meters × 20 meters × 20 meters, in which gas or other fuel would be burned producing hot gases to heat the tubes partly by radiation and partly by convection. In such a system uniform heating is difficult to achieve.

Furthermore the product gas of the conventional reformer is at low pressure and requires compression before use for ammonia synthesis.

Figure 4:
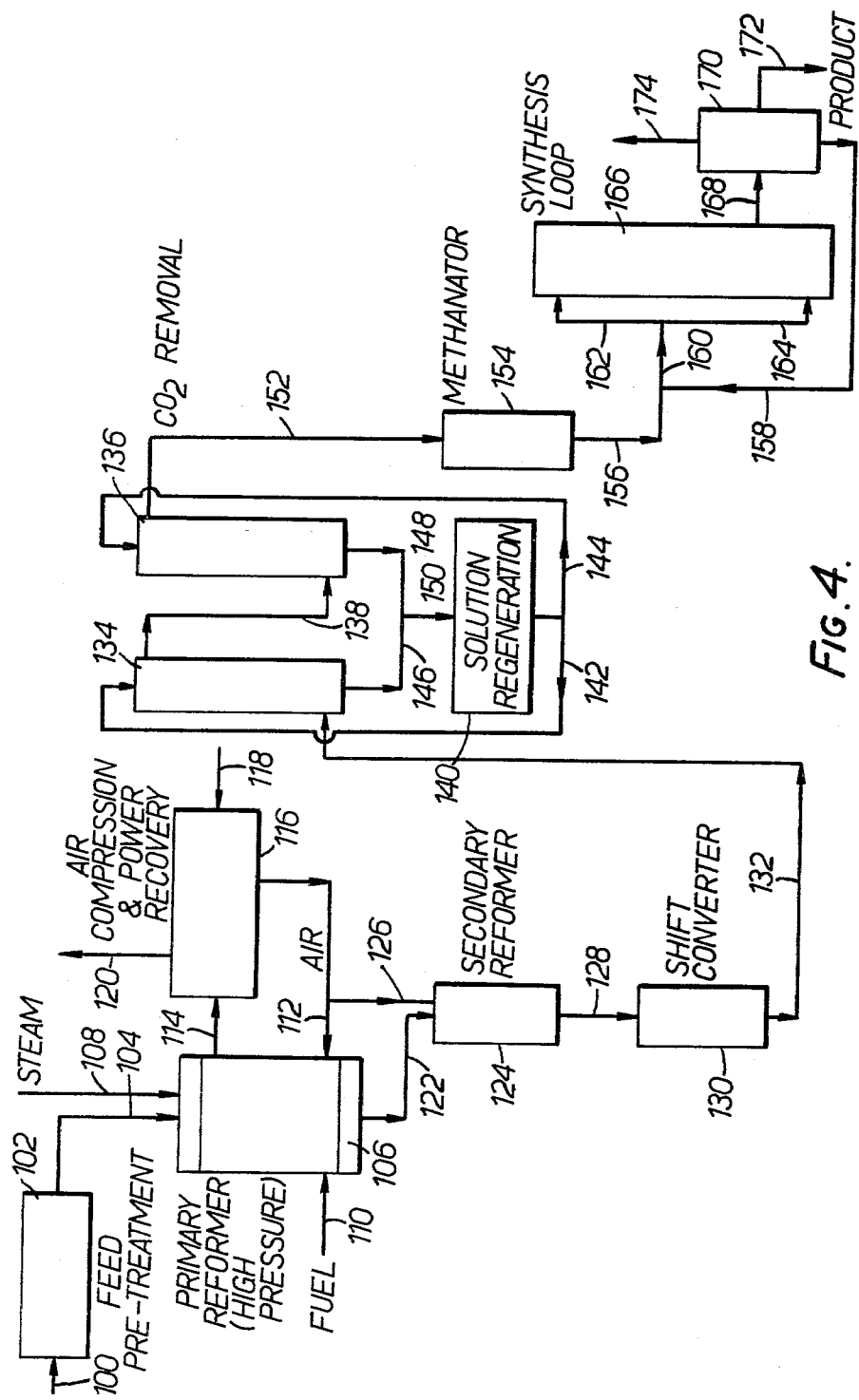
FIG. 4 is a diagram of a flowsheet of an ammonia synthesis plant constructed in accordance with the invention.

FIG. 4 is a diagram of a flowsheet of an ammonia plant operating according to the invention. A liquid or gaseous hydrocarbon feedstock, e.g. natural gas, is supplied via line 100 to a pre-treatment section 102 which may include, for example, a sulphur guard vessel containing a suitable adsorptive bed for removal of sulphur compounds. Pre-treated feedstock flows on via line 104 to primary reformer section 106 to which is also supplied superheated steam via line 108. The feedstock may pass through a pre-heater (not shown) or the steam may be at a sufficiently high temperature to raise the resulting feedstock/steam mixture to a temperature in excess of 500° C. Primary reformer section 106 is constructed in accordance with FIGS. 1 to 3 and is further supplied with a fuel in line 110 and with compressed air via line 112. The pressure in primary reformer section 106 is maintained somewhat in excess of 270 atmospheres. Exhaust gases from the fluidized bed furnace are removed via line 114 and are used to power an air compressor and a generator in the power recovery section 116. Air at atmosphere pressure is taken in by means of line 118 for compression. (The power recovery section 116, it will be appreciated, comprises a turbine arranged to drive a compressor and an alternator in tandem, like items 17, 19 and 21 of FIG. 3). Exhaust gases are vented through line 120.

Hot product gases, consisting essentially of a mixture of CO, $CO_2$, $H_2$, hydrocarbon(s) and steam flow on via line 122 to secondary reformer 124 which is also supplied with compressed air via line 126. Secondary reformer 124 is of conventional construction and is operated at conventional temperatures. The main reaction in the secondary reformer is partial oxidation of remaining hydrocarbons to CO and $H_2$. The resulting gas mixture is passed on via line 128 to a conventional shift conversion zone 130 operated at conventional temperatures using a conventional shift conversion catalyst. In this zone 130 the well known water gas shift reaction takes place, resulting in conversion of carbon monoxide and steam to further hydrogen and carbon dioxide.

From the shift conversion zone 130 the gas mixture flows on via line 132 to a $CO_2$ removal section which may comprise a single scrubbing stage, but which preferably comprises first and second stage $CO_2$ scrubbers 134 and 136 connected one to another by line 138. A suitable scrubbing medium (e.g. an amine, such as monoethanolamine, or an alkali, such as potassium carbonate) is circulated through scrubbers 134 and 136 from scrubbing solution regeneration zone 140 and back again via lines 142, 144, 146, 148 and 150 in a conventional manner.

The gas mixture passes on by means of line 152 to methanator 154 in which remaining traces of CO and $CO_2$ are converted to methane by passage over a suitable methanation catalyst, such as nickel. The temperature of operation of methanator 154 is conventional.

From methanator 154 the resulting synthesis gas, which now consists essentially of a 3:1 $H_2:N_2$ mixture passes directly via line 156 to the ammonia synthesis loop. By choosing the operating pressure of the primary reformer section 106 to be slightly greater than the operating pressure of the ammonia synthesis loop, it is possible to pass synthesis gas directly from methanator 154 via line 156 to the synthesis loop without any further compression. It is thus possible to dispense with the usual very large compressor that is necessary in conventional synthesis gas manufacture. Hence considerable savings in capital costs can be achieved, together with the saving of energy that is required for operating the conventional compressor at this point in the conventional ammonia synthesis flowsheet.

Synthesis gas in line 156 is admixed with recycled gas in line 158. Recycle is achieved by means of the usual recirculator (not shown). The resulting mixture flows on via lines 160, 162 and 164 to ammonia synthesis converter 166 which is of conventional construction and contains a conventional ammonia synthesis catalyst. Converter 166 is operated at a conventional pressure, in the range of 150-600 atmospheres, for example 270 atmosphere and at a conventional temperature. Ammonia-containing gas is recovered via line 168 and passes to ammonia recovery zone 170. Liquid ammonia is recovered via line 172, whilst a purge stream is taken via line 174 and unreacted gas, which still contains ammonia, is recirculated via line 158.

Although the invention has been specifically described in relation to the ammonia synthesis flowsheet of FIG. 4, it will be appreciated that the high pressure reformer can equally be used in the production of synthesis gas for other purposes (for example for methanol synthesis, or for hydroformylation), as well as for the production of hydrogen or hydrogen-rich gas for other purposes (e.g. production of liquid hydrogen, high pressure reduction of iron ores, production of substitute natural gas, and production of town gas). In all such cases, by choice of the appropriate operating pressure for this primary reforming stage, it is possible to dispense with any downstream compression step. Apart from making such design changes as are necessary to accommodate the higher than normal pressure of operation of the primary reformer and omission of the usual final stage compressor, no other change is necessary to conventional flowsheets. In general, the primary reformer of the present invention can be used to replace a primary reformer of conventional construction in any application, including use in oil refineries.

What I claim is:

1. A process for reforming hydrocarbons in a reformer which includes
    a furnace containing a fluidized bed of particulate material, and
    reformer tubes at least partly located in said fluidized bed and the interiors of which are isolated from fluid flow communication with said fluidized bed,
    said process comprising:
    supplying hydrocarbon-containing feedstock to the upstream ends of the tubes,
    reforming said feedstock in the tubes at a pressure in excess of 50 atmospheres absolute,
    maintaining the fluidized bed at a pressure which does not differ significantly from that in the tubes, and
    conducting reformate product in said tubes directly out of said tubes and without entry into said fluidized bed.

2. A process according to claim 1, in which the reformer feedstock is a hydrocarbon gas and steam.

3. A process according to claim 2, in which the same hydrocarbon gas at the same pressure is supplied as fuel for the fluidized bed which fuel is combusted in said fluidized bed to supply heat thereto.

4. A process according to claim 1, in which the fluidized bed is constituted at least in part by a particulate sulphur-absorbing or adsorbing material.

5. A process according to claim 4, in which the particulate material is dolomite.

6. A process according to claim 1, in which the fluidized bed is constituted at least in part by sand.

7. A process according to claim 1, wherein the reformer feedstock comprises high pressure natural gas.

8. A process for reforming hydrocarbons in a reformer which includes
    a furnace containing a fluidized bed of particulate material selected from sand, dolomite and mixtures thereof, and
    reformer tubes at least partly located in said fluidized bed and the interiors of which are isolated from fluid flow communication with said fluidized bed,
    said process comprising:
    supplying a first stream of high pressure hydrocarbon feedstock and steam to the upstream ends of the tubes,
    supplying a second stream of high pressure hydrocarbon as fuel to the fluidized bed and combusting said fuel in said bed to supply heat thereto, said first and second streams being at substantially the same pressure in excess of 100 atmospheres absolute,
    reforming said first stream of hydrocarbon feedstock in the tubes at a pressure in excess of 100 atmospheres absolute,
    maintaining the fluidized bed at a pressure which does not differ significantly from that in the tubes, and conducting reformate product in said tubes directly out of said furnace and without entry into said fluidized bed.

9. A process for the catalytic synthesis of ammonia in a system having
- a reformer for hydrocarbons which includes a furnace containing a fluidized bed of particulate material and reformer tubes at least partly located in said fluidized bed and the interiors of which are isolated from fluid flow communication with said fluidized bed, said process comprising,
- supplying hydrocarbon feedstock and steam to the upstream ends of the tubes,
- reforming said feedstock in the tubes at a predetermined pressure in excess of 50 atmospheres absolute,
- maintaining the fluidized bed at a pressure which does not differ significantly from that in the tubes,
- conducting reformate product in said tubes out of said furnace and without entry into said fluidized bed,
- converting reformate product without significant pressure reduction to a synthesis gas containing hydrogen and nitrogen, and passing resulting synthesis gas without further compression to an ammonia synthesis loop for the catalytic conversion of synthesis gas to ammonia.

10. A method of production of a hydrogen-rich gas at a pressure in excess of 50 atmospheres absolute which comprises reforming a hydrocarbon feedstock in a reforming zone comprising a plurality of reformer tubes at least partly located in a fluidized bed of particulate material in a furnace, the interiors of the tubes being isolated from fluid flow communication with said fluidized bed, maintaining the interiors of the tubes in the reforming zone at a pressure in excess of 50 atmospheres absolute, supplying fuel and oxygen-containing gas to the fluidized bed and combusting said fuel therein to thereby supply heat and maintain the interiors of the tubes in the reforming zone under reforming conditions, maintaining the fluidized bed at a pressure not significantly different from the pressure in the interiors of the tubes in the reforming zone, and conducting reformate product in said tubes directly out of said furnace and without entry into said fluidized bed.

* * * * *